United States Patent [19]

Long, Jr.

[11] Patent Number: 4,659,464
[45] Date of Patent: Apr. 21, 1987

[54] APPARATUS FOR DISPERSING SLUDGE WITH GAS IMPINGEMENT

[75] Inventor: Charles A. Long, Jr., Birmingham, Ala.

[73] Assignee: Long Enterprises, Inc., Birmingham, Ala.

[21] Appl. No.: 823,899

[22] Filed: Jan. 30, 1986

Related U.S. Application Data

[63] Continuation-in-part of Ser. No. 650,960, Sep. 14, 1984, Pat. No. 4,582,612, which is a continuation-in-part of Ser. No. 560,058, Dec. 9, 1983, Pat. No. 4,487,699.

[51] Int. Cl.[4] .............................................. C02F 1/78
[52] U.S. Cl. .................................. 210/221.1; 210/760
[58] Field of Search ................ 210/760, 764, 765, 85, 210/86, 90, 104, 134, 137, 138, 143, 173, 197, 220, 232, 604, 627, 628, 629, 174, 194, 621, 622, 96.1, 743, 221.1, 221.2

[56] References Cited

U.S. PATENT DOCUMENTS

| | | |
|---|---|---|
| 888,090 | 5/1908 | Kestner . |
| 1,790,975 | 2/1931 | Dallas et al. . |
| 2,054,395 | 9/1936 | Streander . |
| 2,077,907 | 4/1937 | Streander . |
| 2,090,384 | 8/1937 | Durdin, 3d . |
| 2,165,889 | 7/1939 | Fischer et al. . |
| 2,337,507 | 12/1943 | Thayer . |
| 2,468,865 | 5/1949 | Campobasso . |
| 2,591,134 | 4/1952 | Canariis . |
| 2,597,802 | 5/1952 | Kappe . |
| 3,054,602 | 9/1962 | Proudman . |
| 3,133,017 | 5/1964 | Lambeth . |
| 3,143,498 | 8/1964 | Fordyce et al. . |
| 3,271,304 | 9/1966 | Valdespino et al. . |
| 3,323,782 | 6/1967 | Clough . |
| 3,335,082 | 8/1967 | Ullrich . |
| 3,341,450 | 9/1967 | Ciabattari et al. . |
| 3,423,309 | 1/1969 | Albertson . |
| 3,459,303 | 8/1969 | Bradley . |
| 3,476,250 | 11/1969 | Fifer . |
| 3,497,185 | 2/1970 | Dively . |
| 3,515,377 | 6/1970 | Ray . |
| 3,525,685 | 8/1970 | Edwards . |
| 3,547,813 | 12/1970 | Robinson et al. . |
| 3,572,658 | 6/1970 | Ravitts . |
| 3,573,203 | 3/1971 | Kaelin . |
| 3,650,950 | 3/1972 | White . |
| 3,660,277 | 5/1972 | McWhirter et al. . |
| 3,677,409 | 7/1972 | Ferm et al. . |
| 3,724,667 | 4/1973 | McKinney . |
| 3,725,258 | 4/1973 | Spector et al. . |
| 3,772,188 | 11/1973 | Edwards . |

FOREIGN PATENT DOCUMENTS 470873 8/1936 United Kingdom .

*Primary Examiner*—Frank Sever
*Attorney, Agent, or Firm*—Panitch Schwarze Jacobs & Nadel

[57] ABSTRACT

Provided in an apparatus for sewage treatment is an improvement including, a recycling means for recycling gas from the upper portion of a vessel through a pumping means to pressurize the gas and into a second dispersing means, a second dispersing means comprising means for enabling a stream of pressurized gas from a plurality of gas dispersing nozzle assemblies to impinge upon a major portion of sludge being channeled from a first sludge dispersing means and to divide and disperse sludge particles within the upper portion of the vessel to become oxygenated as they interact with oxygen in the upper portion of the vessel, and to enable the oxygenated particles to fall to an to be collected in the lower portion of the vessel, each nozzle assembly directing a stream of the pressurized gas toward one outlet of a channeling means of the first dispersing means, the outlets of the first sludge dispersing means being arranged radially about the first sludge dispersing means, the nozzle assemblies being arranged radially about the first sludge dispersing means and along an inner wall of the vessel in generally horizontal alignment with the outlets.

9 Claims, 3 Drawing Figures

APPARATUS FOR DISPERSING SLUDGE WITH GAS IMPINGEMENT

CROSS-REFERENCE TO RELATED APPLICATIONS

This application is a continuation-in-part of copending U.S. patent application Ser. No. 650,960, filed Sept. 14, 1984, entitled "Improved Sewage Sludge Treatment Apparatus" (the "copending application") that issued as U.S. Pat. No. 4,582,612 which, in turn, was a continuation-in-part of U.S. patent application Ser. No. 560,058, filed Dec. 9, 1983, which issued as U.S. Pat. No. 4,487,699 (the "original patent").

BACKGROUND OF THE INVENTION

This invention relates to an improvement to the apparatus for treating sewage and, in particular, sewage sludge, set forth in the above-identified copending application and original patent. More specifically, the present invention relates to apparatus for dispersing streams of prechanneled sludge to be treated throughout an oxygen-rich atmosphere by pressurized streams of gas directed toward and impinging on the streams of sludge.

Traditionally, sewage, and specifically sludge, has been difficult to treat because it is, almost by definition, extremely variable in composition. In addition to human liquid and solid organic waste, the sludge to be treated in accordance with the present invention may include industrial and commercial sludge which is susceptible to aerobic treatment. In general, the present invention provides a means and process for highly efficient interaction of sludge particles with oxygen, in the form of $O_2$ gas and/or $O_3$ gas.

The present invention preferably employs the use of hyperbaric vessels containing pressurized oxygen and the sludge, and provides means for increasing the surface area of sludge to be treated and the interaction time in which sludge is oxygenated compared to prior art apparatus and processes.

A further feature of the present invention resides in the substantially infinite adjustability of the various components of the apparatus and process so that they can be finely tuned at any time and adjusted automatically, semi-automatically and/or manually to treat different types, compositions and thicknesses of various sludges without requiring the use of alternate equipment.

The present invention is intended primarily for treatment of activated sludge, namely, waste from domestic, commercial and industrial sources which create a biologically degradable material. A batch of the pH adjusted waste to be treated is divided into small droplets and the droplets are dispersed within a pressure vessel where they are oxygenated by being exposed to oxygen ($O_2$) and ozone ($O_3$) for a substantial period of time. The Biological Oxygen demand (BOD) and the Chemical Oxygen Demand (COD) of the waste are substantially saturated and satisfied. The addition of ozone produces an almost complete destruction and elimination of coliform, fecal coliform, salmonella and other harmful bacteria from the batch of sludge being treated. Although the coliform and fecal coliform bacteria are not in themselves particularly harmful, when they are present, it is recognized that other harmful bacteria are present. Thus, when the coliform and fecal coliform bacteria are destroyed, it is an indication that the other harmful bacteria, which are more difficult to detect, are also destroyed.

The present invention is intended to be used in a large scale sewage treatment system for use in treating activated sludge which is generally too thick to be treated efficiently on a large scale basis by presently existing commercial equipment known to the inventor. The present invention can be incorporated with presently existing wastewater treatment plants. Most existing wastewater treatment plants are capable of producing sludge with a solid content of about one and one-half percent by weight. The present invention has been designed to treat sludge having a solid content of greater than four percent to about six percent by weight, more preferably from about five percent to about six percent. The process and apparatus are believed to be most cost effective with sludge having solids content of about five and one-half percent to six percent by weight.

The present invention is an improvement of the inventions illustrated, described and claimed in the prior filed copending application and original patent, the disclosures of which are hereby incorporated by reference herein. The sludge treating systems, processes and apparatus disclosed in the copending application and original patent enhanced the treatment of sludge compared to the systems, processes and apparatus previously known for that purpose. The present invention is a novel improvement of the inventions of the copending application and original patent. The improvement comprises an efficient means of dispersing the sludge in the reactor assembly by impinging streams of pressurized oxygen-rich gas upon streams of sludge dispersed from the channeling means of the first dispersing means of the apparatus of the copending application and original patent. Thus, this invention relates to novel second dispersing means for dispersing the sludge particles throughout the oxygen-rich atmosphere within the reactor assembly. The present invention preferably is used with the same systems and the same types of reactor assemblies used in the processes and apparatus disclosed in the copending application and original patent. Therefore, only the components of the overall system which are necessary to understand the present invention will be described herein.

It is believed that the gas impingement second sludge dispersing means of the present invention divides the sludge streams resulting from the channeling means of the first dispersing means into smaller and lighter weight particles having a greater surface area per volume ratio than the second dispersing means disclosed and claimed in the copending application or original patent. This increases the relative oxygenation of the particles and thus increases the efficiency of the oxygenation process. In addition, the lighter weight particles with the greater surface area descend slower throughout the oxygen-rich atmosphere in the upper portion of the reaction chamber, increasing interaction time in which the sludge is oxygenated compared to apparatus and processes of the prior art and of the copending application and original patent. The greater interaction time also enhances the overall efficacy of the process.

SUMMARY OF THE INVENTION

The present invention includes an apparatus for use in a sewage sludge treatment system comprising means for enhancing the surface area of the sludge to be treated and the time of interaction of finely divided sludge particles with oxygen-rich atmosphere including a vessel including sludge inlet means for conveying sludge to the vessel to be accumulated in a lower portion of the vessel, a sludge delivery means having a discharge end for delivering the sludge from the lower portion to an upper portion of the vessel, oxygen inlet means for delivering oxygen to the upper portion of the vessel, sludge outlet means for removing sludge from the lower portion of the vessel, and gas outlet means for removing gas from the upper portion of the vessel, first dispersing means and a plurality of second sludge dispersing means located within the upper portion of the vessel, the first sludge dispersing means being generally axially aligned with and attached to the discharge end of the sludge delivery means, the first sludge dispersing means including a plurality of channeling means for channeling the sludge from the sludge delivery means through outlets in the first sludge dispersing means toward the second sludge dispersing means, each of the second sludge dispersing means being generally aligned with a channeling means of the first sludge dispersing means, wherein the improvement comprises a recycling means for recycling the gas from the upper portion of the vessel through a pumping means to pressurize the gas and into the second dispersing means, the second dispersing means comprising a plurality of gas dispersing nozzle assemblies, each nozzle assembly directing a stream of the pressurized gas toward one of the channeling means of the first dispersing means, whereby the stream of pressurized gas from the nozzle assemblies impinges upon a major portion of the sludge being channeled from the first sludge dispersing means, divides the sludge into fine particles and disperses the sludge particles within the upper portion of the vessel to become oxygenated as they interact with oxygen in the upper portion of the vessel, the oxygenated particles falling to and being collected in the lower portion of the vessel.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF PREFERRED EMBODIMENT

Figure 1:
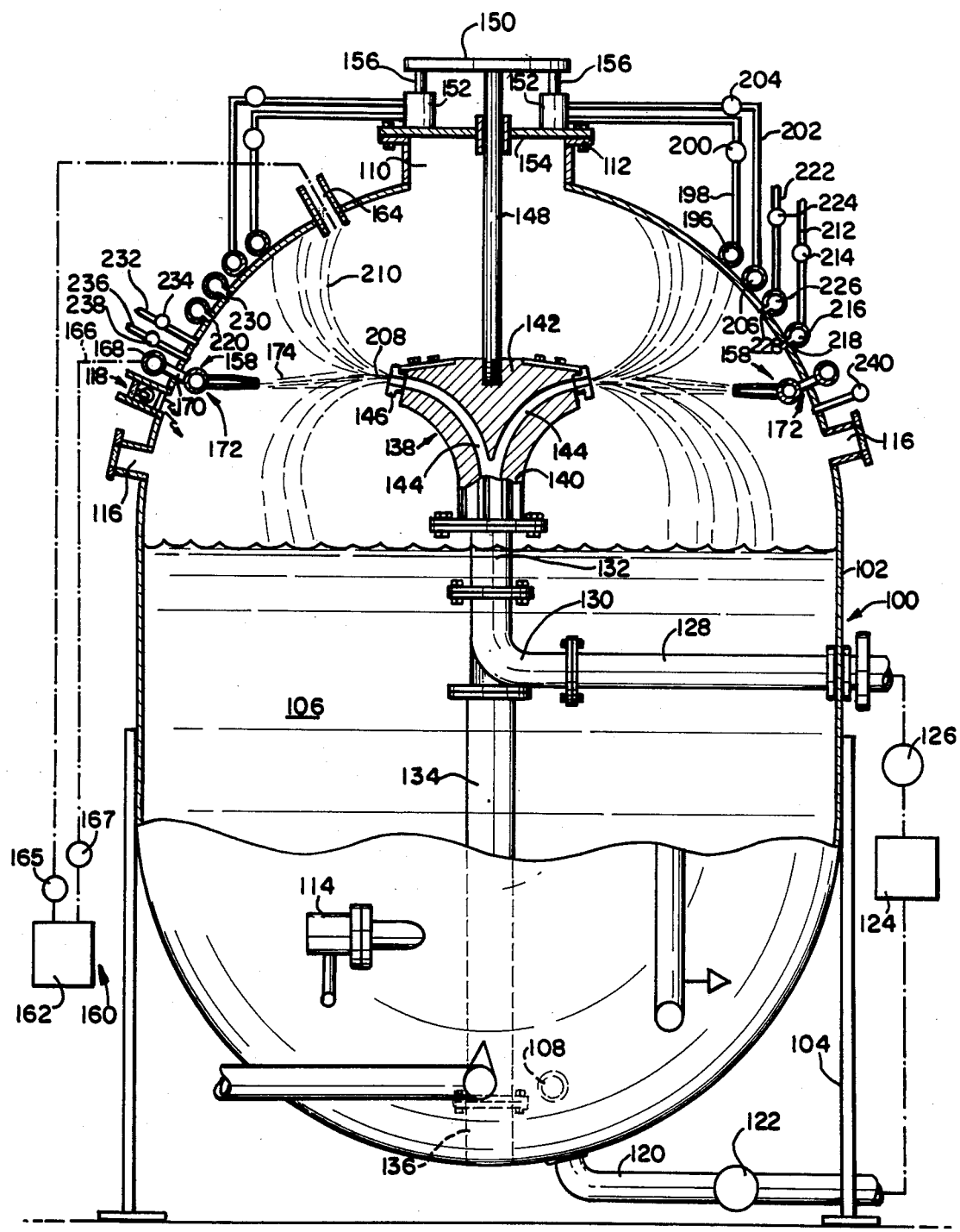
FIG. 1 is a vertical cross-sectional view, partly in side elevation, of one embodiment of a reactor assembly and related components in accordance with the invention.

Referring to the drawings in detail, wherein like numerals indicate like elements, there is shown in FIG. 1 a reactor assembly 100 with which the present invention may be used. Reactor assembly 100 includes a treatment vessel 102 supported above a foundation of any suitable type and strength by support members 104. Although treatment vessel 102 can be of any desired size, it is preferred that it be capable of handling a large volume of sludge. Typical dimensions of the vessel having a shape illustrated in FIG. 1 would be about twelve feet in diameter and about sixteen feet in height. Treatment vessel 102 may be made in shapes other than that illustrated. The vessel should be able to withstand pressures of at least six atmospheres, since it is preferred that the sludge be subjected to a hyperbaric, that is, pressurized treatment. Accordingly, the material used to make the vessel should be durable, as well as easy to maintain, and non-reactive with an acidified sludge environment. A suitable material would be stainless steel, for example. Various modifications of the reactor assembly will be apparent to those skilled in the art, depending on the particular situation. These modifications may depend, in part, on the composition of the sludge, its viscosity, solids contents, etc.

As illustrated in FIG. 1, sludge 106 is contained in a lower portion of the vessel, after entering the vessel through reactor inlet conduit 108. The "lower portion" of the vessel includes any portion of the vessel containing liquid and need not be limited to any particular volume of sludge within the vessel. However, it is important that there be an "upper portion" of the vessel not containing sludge located above the lower portion and below a first dispersing means 138 and a second dispersing means generally designated by numeral 158. The upper portion of the vessel likewise is not defined by any specific volume, but should be sufficient to contain the first dispersing means illustrated in the form of distributor head 138 and gas dispersing nozzle assemblies 172 of second dispersing means 158. The upper portion should have sufficient volume so that the dispersed sludge can interact completely with the oxygen-rich atmosphere in the upper portion.

A manhole opening 110 is located in a portion of treatment vessel 102, preferably at the top. A flange 112 is formed around the upper rim of the manhole opening. In addition, treatment vessel 102 is provided with a plurality of viewports 116. To aid in viewing the contents of the vessel, a number of lighting sources can also be provided. An example of one such light source 118 is illustrated generally schematically in FIG. 1. The sludge in the lower portion of vessel 102 is mixed by mixer 114.

The sludge is delivered from the lower portion of the vessel to the upper portion by a pump through a series of conduits. Sludge 106 travels through a reactor circulation conduit 120, reactor circulation valve 122, reactor circulation pump 124, and reactor circulation valve 126 into internal reactor circulation conduit 128. The sludge then passes through elbow conduit 130 connected at one end by flanges to inlet conduit 128 and at another flanged end to upright delivery conduit 132. Conduit 132 is attached via a flanged outlet to a first or lower section 140 of a first dispersing means or distributor head 138. To support the conduits 128, 130, 132 and lower section 140 of the first sludge dispersing means 138, a support structure is provided, preferably centrally located within vessel 102.

The support structure includes flange support member 134 attached to flanged elbow 130 at one end and to flange support member 136 at the other end. Support member 136 is welded or otherwise secured in a suitable manner to the bottom of the treatment vessel.

In addition to the first or lower section 140, the distributor head 138 comprises a second or upper section 142. Channeling means are formed between lower section 140 and upper section 142 of distributor head 138.

The channeling means takes the form of a plurality of channels 144 which preferably, and as illustrated, converge to form a common or single inlet passageway towards the bottom of lower section 140. The upper portion of channels 144 diverge in a generally radial pattern. Sludge entering the lower portion of channels 144 is dispersed from the channel outlets, preferably through nozzle assemblies 146, such that a major portion of the sludge is directed in streams toward the plurality of gas dispersing nozzle assemblies 172 of second dispersing means 158, each of which is aligned with a channel outlet.

Also preferably associated with upper section 142 are a plurality of nozzle assemblies 146, with each nozzle assembly being aligned with or directly adjacent to the outlet end of each channel formed in distributor head 138. Depending on the type and viscosity of the sludge, the nozzle assemblies, which include adjustable nozzle elements, help direct the stream of sludge particles within the upper portion of treatment vessel 102 toward gas dispersing nozzle assemblies 172 of second dispersing means 158.

To tune the reactor to different types and/or viscosities of sludge and to purge the channeling means of any blockage, the distance, and therefore the size of the channels between lower section 140 and upper section 142 of distributor head 138 is adjustable. As illustrated in FIG. 1, one end of shaft 148 is attached to the upper section 142. The other end of shaft 148 is attached to the lift bar or plate 150. The lift bar or plate 150 is raised or lowered by activating hydraulic lift means secured to the cylinder mounting plate 154 which is bolted to the flange 112. A gasket (not shown) is located between the bottom of the plate and the top of the flange to maintain a fluid tight seal. Thus, hydraulic cylinders 152 are mounted to plate 154 and hydraulic cylinder piston rods 156 are attached to the underside of lift bar or plate 150. To raise upper bar or plate 150 and therefore shaft 148 and upper section 142 of distributor head 138, pressurized hydraulic fluid flows from a hydraulic supply and pump system described in the original patent to a pressure manifold 196 through conduit 198 and remote control lift inlet valve 200 into hydraulic cylinder lift means 152. Lift outlet conduit 202 extends from each hydraulic cylinder 152 and hydraulic fluid is returned through lift outlet conduit 202 through remote control lift outlet valve 204 and into hydraulic return manifold 206. By controlling the opening and closing of the remote control valves, the upper section 142 of distributor head 138 reciprocates away from and toward lower section 140. The structure and generation of the illustrated preferred form of first dispersing means 138 is described in more detail in the copending application, particularly with respect to FIGS. 13 through 15.

Gas dispersing nozzle assemblies 172 of second dispersing means 158 are adjustably attached to the inner peripheral walls of the treatment vessel 102 by any suitable means, such as a threaded connection, a ball and socket assembly or the like.

The dotted lines in the upper portion of treatment vessel 102 generally illustrate the flow path of sludge from the first sludge dispersing means 138 toward a second sludge dispersing means 158 by which the sludge is dispersed in the form of streams 208 and fine particles 210 throughout the upper portion of the vessel until the particles fall by gravity to the sludge pool 106 in the lower portion of the vessel.

Because of the force with which the sludge impinges against the pressurized gas directed through the second dispersing means 158, the sludge is dispersed as particles 210 throughout the upper portion of the treatment vessel. In this way, the sludge is fully oxygenated by oxygen and/or ozone. Although sludge spray and particle lines 208 and 210 generally show some typical dispersal patterns, it will be apparent to those skilled in the art that the indicated streams of particles are only exemplary and do not purport to show the exact, or all possible, streams resulting from the operation of reactor assembly 138.

The oxygen-rich atmosphere within the upper portion of each of the treatment vessels 102 preferably is also supplied through a manifold system as best illustrated in FIG. 1. While some activation of the sludge would occur in an atmosphere of air, the sludge becomes more highly activated and more completely treated when small sludge particles fully interact with an oxygen-rich atmosphere. It is also presently preferred to use a pressurized oxygen-rich atmosphere, by which oxygenation occurs still more quickly and completely.

As used herein, the terms "oxygen" and "oxygen-rich atmosphere" mean that the atmosphere contained in the upper portion of the treatment vessel is substantially comprised of oxygen in the form of $O_2$ gas and/or $O_3$ gas (ozone). It is presently preferred to have a mixture of $O_2$ and $O_3$ in the proportion of about 90-95% by volume $O_2$ and 5-10% by volume $O_3$. The presently preferred pressure range is from about 45 pounds per square inch gauge (p.s.i.g.) to about 65 p.s.i.g. It is believed that 60 p.s.i.g. is the optimum pressure to be used in accordance with the present invention.

$O_2$ from a source, such as a liquid oxygen tank (not shown), is pumped through $O_2$ supply conduit 212 and remote controlled $O_2$ inlet valve 214 into an $O_2$ manifold 216 associated with each treatment vessel 102. Along the length of $O_2$ manifold 216 are several $O_2$ entry ports, two of which are indicated schematically as 218, 220 in FIG. 1, through which $O_2$ flows into the upper portion of treatment vessel 102. Ozone is generated by any conventional ozone generator, not illustrated. The ozone is then pumped through $O_3$ supply conduit 222, through remote controlled $O_3$ inlet valve 224 and into $O_3$ manifold 226. $O_3$ entry ports, two of which are shown at 228, 230 in FIG. 1 allow the ozone to enter the upper portion of treatment vessel 102.

To flush the upper portion of any undesirable gas or to release the gas pressure within treatment vessel 102, there is provided an outlet conduit 232 and a remote controlled outlet or bleed-off valve 234. Outlet conduit 232 can be vented to the atmosphere, to pollution control equipment, or to other storage or treatment areas not directly relevant to the present invention. A pressure relief valve 238 is connected by pressure relief conduit 236 to the upper portion of the treatment vessel. The threshold of the pressure relief valve can be adjusted depending upon the particular circumstances involved in the treatment system. A pressure sensor 240 includes pressure sensing means and signal generating means of conventional design to indicate the pressure within the upper portion of treatment vessel 102.

Figure 2:
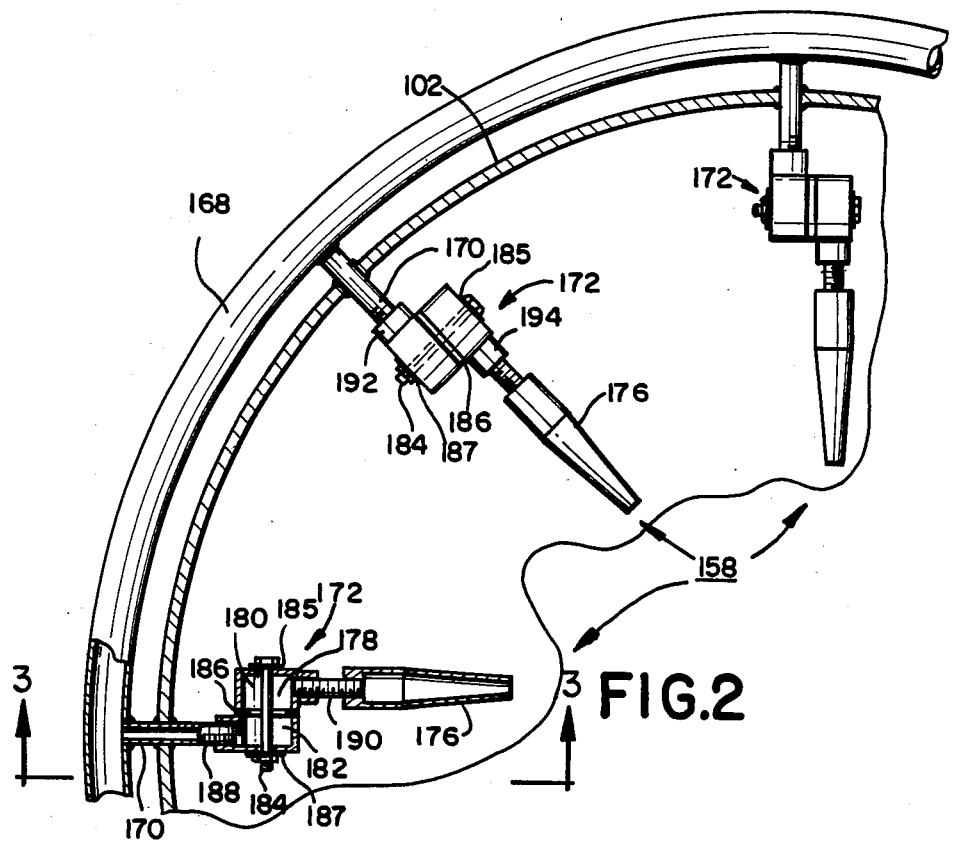
FIG. 2 is a horizontal cross-sectional view through a portion of the reactor assembly of FIG. 1, showing one of the gas dispersing nozzle assemblies of the second dispersing means in horizontal cross-section, and two of the other gas dispersing nozzle assemblies of the second dispersing means in plan view.

The present invention includes a recycling means 160 for recycling the gas from the upper portion of the treatment vessel 102 through a pumping means 162 to pressurize the gas into the second dispersing means 158. In the preferred embodiment, the recycling means 160 is external to the treatment vessel 102 and comprises an intake pipe 164, a valve 165 in pipe 164, a pumping means 162, a gas discharge pipe 166, a valve 167 in pipe 166, a gas dispersing manifold 168, and a plurality of gas conduit means 170 connecting manifold 168 to each of a plurality of gas dispersing nozzle assemblies 172. The valved gas intake pipe 164 conducts gas from the upper portion of the treatment vessel 102 to pumping means 162. The valved gas discharge pipe 166 then conducts the gas from the pumping means 162 through a gas dispersing manifold 168 external to the vessel 102. A gas conduit means 170 extending through the vessel wall conducts the gas from manifold 168 to nozzle assemblies 172 of second dispersing means 158, as seen in FIGS. 1 and 2. In the preferred embodiment, the valves 165 and 167 are remotely controlled valves and the pumping means 162 includes a hydraulic motor-driven pump.

Figure 3:
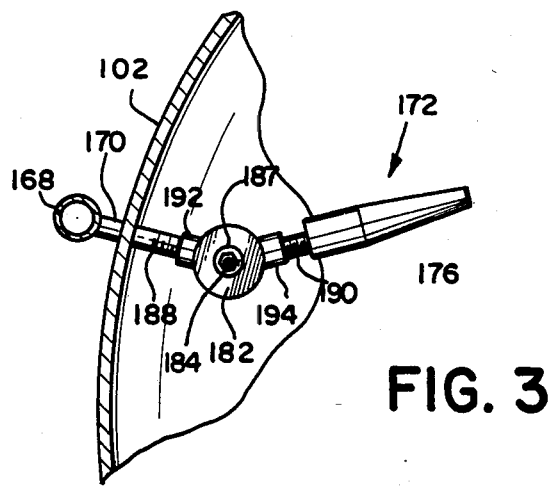
FIG. 3 is a vertical cross-sectional view through a portion of the reactor assembly of FIG. 1 taken along line 3—3 of FIG. 2 to show one of the gas dispersing nozzle assemblies of the second sludge dispersing means in side elevation.

A plurality of gas dispersing nozzle assemblies 172 of the second dispersing means 158 is best shown in FIGS. 2 and 3. Each nozzle assembly 172 includes a means for adjusting the alignment of the nozzle assembly with respect to one of the channeling means 144 of the first dispersing means 138. Each nozzle assembly 172 directs a stream of pressurized gas, as illustrated in FIG. 1, from recycling means 160 toward one of the channeling means 144 of the first dispersing means 138. The stream of pressurized gas 174 from the nozzle assemblies 172 impinges upon a major portion of the sludge 106 being channeled from the first sludge dispersing means 138. The streams of pressurized gas impinging on the sludge 106 divide the sludge into fine particles and disperse these sludge particles within the upper portion of vessel 102. The sludge particles become oxygenated by interacting with oxygen in the upper portion of the vessel 102. The oxygenated particles fall and are collected in the lower portion of vessel 102.

The gas dispersing nozzle assembly 172, as best shown in FIGS. 2 and 3, comprises a nozzle 176 and a hollow swing joint 178 having a movable portion 180 and a fixed portion 182. The movable portion 180 and the fixed portion 182 are held together in a fluid tight manner. In the preferred embodiment, the fixed and movable portions 180 and 182, respectively, are secured together in a desired alignment by a nut and bolt fastening means 184, as shown in FIGS. 2 and 3, with a gasket 186 between the fixed and movable portions 180 and 182, respectively. Gaskets 185, 187 are also used to assure a fluid tight fit, between the fastening means and swing joint components.

The fixed portion 182 preferably is mounted to the gas conduit 170 by a threaded connection 188 for rotational movement, as best shown in FIG. 2. In addition, the nozzle 176 preferably is mounted to the movable portion 180 by a threaded connection 190. In the preferred embodiment, a threaded coupling portion 192 secures the fixed portion 182 of the swing joint 178 in position with respect to the conduit 170, and a threaded coupling portion 194 secures the nozzle 176 in position with respect to the movable portion of the swing joint 180, as shown in FIGS. 2 and 3.

The components of the present invention preferably are interrelated to a local control station for controlling the operation of input of sludge to be treated, treated sludge output, hydraulic mixing, driving and pumping means, $O_2$ and $O_3$ supply means, gas outlet means, and the like. The local control stations preferably are controlled by a master control station, including data processing means. A general description of the operation of the system according to the present invention, as controlled by the local and master control stations and data processing means was previously described and can be referenced to the original patent. Therefore, it need not be described in detail in this application.

It will be recognized by those skilled in the art that changes may be made to the above-described embodiment of the invention without departing from the broad inventive concept thereof. It is understood, therefore, that this invention is not limited to the particular embodiment disclosed, but is intended to cover all modifications which are within the scope and spirit of the invention as defined by the appended claims.

I claim:

1. In an apparatus for use in a sewage sludge treatment system comprising means for enhancing the surface area of the sludge to be treated and the time of interaction of finely divided sludge particles with oxygen-rich atmosphere including a vessel including sludge inlet means for conveying sludge to the vessel to be accumulated in a lower portion of the vessel, a sludge delivery means having a discharge end for delivering the sludge from the lower portion to an upper portion of the vessel, oxygen inlet means for delivering oxygen to the upper portion of the vessel, sludge outlet means for removing sludge from the lower portion of the vessel, and gas outlet means for removing gas from the upper portion of the vessel, first sludge dispersing means and a plurality of second sludge dispersing means located within the upper portion of the vessel, the first sludge dispersing means being generally axially aligned with and attached to the discharge end of the sludge delivery means, the first sludge dispersing means including a plurality of channeling means for channeling the sludge from the sludge delivery means through outlets in the first sludge dispersing means toward the second sludge dispersing means, each of the second sludge dispersing means being generally aligned with a channeling means of the first sludge dispersing means, wherein the improvement comprises:

a recycling means for recycling the gas from the upper portion of the vessel through a pumping means to pressurize the gas and into the second dispersing means, the second dispersing means comprising means for enabling a stream of pressurized gas from a plurality of gas dispersing nozzle assemblies to impinge upon a major portion of the sludge being channeled from the first sludge dispersing means and to divide and disperse the sludge particles within the upper portion of the vessel to become oxygenated as they interact with oxygen in the upper portion of the vessel, and to enable the oxygenated particles to fall to and to be collected in the lower portion of the vessel, each nozzle assembly directing a stream of the pressurized gas toward one outlet of the channeling means of the first dispersing means, the outlets of the first sludge dispersing means being arranged radially about the first sludge dispersing means, the nozzle assemblies being arranged radially about the first sludge dispersing means and along an inner wall of the vessel in generally horizontal alignment with the outlets.

2. Apparatus according to claim 1 wherein the recycling means is external to the vessel and comprises a valved gas intake pipe to conduct the gas from the upper portion of the treatment vessel to the pumping means, and a valved gas discharge pipe for conducting the gas from the pumping means to the second dispersing means.

3. Apparatus according to claim 2 wherein the valves in the gas intake pipe and gas discharge pipe are remotely controlled valves.

4. Apparatus according to claim 2 further comprising a gas dispersing manifold external of the vessel through which the gas is conducted from the gas discharge pipe, and gas conduit means extending through the vessel wall to conduct the gas from the manifold to the nozzle assemblies.

5. Apparatus according to claim 4 further comprising means for adjusting the alignment of the gas dispersing nozzle assemblies with respect to the channeling means of the first dispersing means.

6. Apparatus according to claim 5 in which the gas dispersing nozzle assembly includes a hollow swing joint having a movable portion and a fixed portion being mountable together in a fluid tight manner, the fixed portion being mounted for rotational movement by a threaded connection to the gas conduit, and a nozzle mounted by a threaded connection to the movable portion.

7. Apparatus according to claim 6 wherein the nozzle assembly further comprises a gasket between the fixed and movable portions of the swing joint, the fixed and movable portions being secured together in a desired alignment by nut and bolt fastening means.

8. Apparatus according to claim 7 wherein the nozzle assembly further comprises a first lock nut to secure the fixed portion of the swing joint in position with respect to the conduit, and a second lock nut to secure the nozzle in position with respect to the movable portion of the swing joint.

9. Apparatus according to claim 1 wherein the pumping means includes a hydraulic motor driven pump.

* * * * *